INVENTOR
ERLAND SAMUEL LJUNGDAHL
ATTORNEYS

United States Patent Office 3,045,297
Patented July 24, 1962

3,045,297
MULTIPLE PANE WINDOW UNIT
Erland Samuel Ljungdahl, Fafnerstigen 9,
Djursholm, Sweden
Filed July 25, 1957, Ser. No. 674,158
Claims priority, application Sweden July 31, 1956
7 Claims. (Cl. 20—56.5)

The present invention refers to a sealing arrangement for uniting two glass panes by a metal strip so as to form a hermetically sealed unit which is specially suitable as double- or multipane-windows, to prevent condensation on the inner surfaces of the panes. The same arrangement is also applicable to other glass constructions where a somewhat flexible pressure tight seal is desired.

In climates where there are greate differences of temperature between the outdoor and comfortable indoor temperature multipane-windows have been generally used. Several inventions have dealt with the prevention of condensation between the panes. The most successful of these inventions have been different kinds of heremetically sealed double- or multipane-constructions. The production of such windows has however been rather complicated and thereby expensive or it has given a product which has not been durable.

According to the invention this purpose is attained in a rather simple and flexible way. The invention is based on the well-known fact that a sufficiently thin foil of e.g. copper, or certain other ductible metals or alloys can be fused with glass so that the metal follows the thermal movements of the glass. Until now the production of multiple-glass has for instance involved metallizing the edges of the panes, whereupon a metal-strip has been soldered to the edges as a connection between the panes. According to the invention the connection between the panes is formed by a thin metal-strip with a higher melting-point than the glass, said metal-strip being directly fused to the glass edgewise between the panes at a small distance from the edges of said panes. The metal-strip which is of uniform width and has a suitable thickness for instance between 0.005 and 0.1 times the thickness of the panes is formed to a closed or almost closed rectangular ring and inserted between two glass panes somewhat larger than said ring whereupon the whole is heated to a temperature where the viscosity of the glass is sufficiently low to prevent cracking on further local heating, but sufficiently high to prevent deformation of the panes under the influence of gravity, a temperature of about 500° C. being appropriate with soda glass. Hereupon the temperature of the metal ring is further raised, preferably by inductively or directly supplied electric current through the ring, so as to melt the glass being in contact with the ring. The molten glass wets the metal edges which penetrate into the glass surfaces, by the force of gravity or by mechanically applied force, to a depth of a few times the thickness of the metal-strip. By heating the strip with alternating current in a magnetic field mechanical vibrating forces are developed which aid in giving a good bond between the metal and the glass. In order to improve still further the wetting of the metal which is essential for a tight seal, the metal-strip may be treated by heating to give a cuprous oxide layer or coated with a layer of a bonding agent such as easy melting glasspowder or borax, before the strip is inserted between the panes.

The fusing of the glass to metal seal can partly or wholly be accomplished by means of dielectric heating by electrodes outside the glass panes, the concentration of the electric field at the edges of the metal strip giving the desired local heating of the glass.

After cooling of the unit the space between the panes is hermetically sealed with the exception of a small hole or vent, necessary for equalizing the pressure during the cooling. During the fusing, or after cooling, the space between the panes can be filled with a dry gas of suitable composition and pressure with respect to heat transmission and dew point, whereupon the equalizing hole is sealed by soldering.

If the metal strip is made rectilinear for too long a distance there is a risk of mechanical tensions in the edge which might crack the glass. This drawback can be eliminated if the metal strip is corrugated in such a way that the intersection line between the strip and the glass is curved, preferably to a sine curve with a wavelength between 0.1 and 10 times the thickness of the glass.

FIG. 1 shows the approximately sinusoidal line of fusion 1 in a glass surface 2 viewed perpendicularly to the glass. This corrugation also stiffens the bond against forces perpendicular to the local main extension of the metal strip; such forces arise from for instance different temperatures of the glass panes. The essential effect of this corrugation is limited to the parts of the strip fused to or near the glass surfaces. The middlemost part of the metal strip can preferably remain flat or be corrugated with the corrugation-waves perpendicular to the aforementioned waves in order further to relieve the bond of mechanical stresses. Such a longitudinal corrugation of the strip can also absorb the movements brought about by variation of the air pressure.

Figure 1:
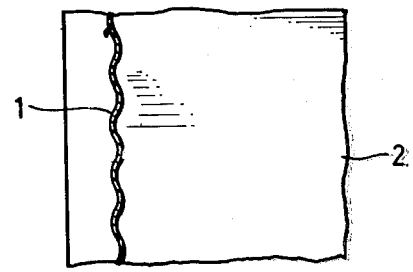
Figure 2:
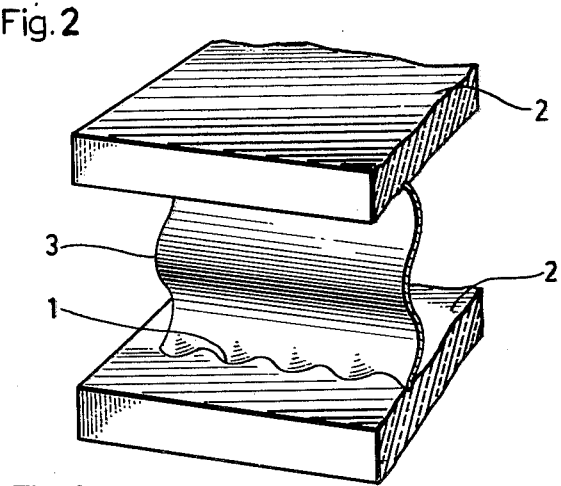
FIG. 2 shows a corner of a double window with the strip 3 corrugated both parallel and perpendicular to the glass surfaces. Said longitudinal corrugation gives in itself an improvement of the insulating capacity and allows in a simple way the application of further panes within the closed space in order to further improve the insulating capacity.
Figure 3:
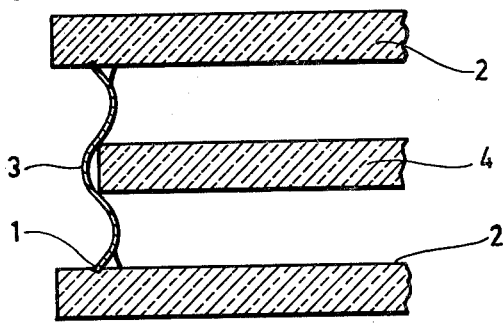
FIG. 3 shows one such pane 4 carried in a longitudinal groove of the strip.

The inner surface of the strip can be treated in such a way that the intermediate panes do not adhere to it. For an aesthetic reason and as a means of insulation a separate inner frame can be put inside of the metal strip before the bonding. Such a frame is also suitable to carry intermediate panes.

If an especially good insulation is necessary the space between the panes can be evacuated in which case the main part of the exterior pressure can be taken up by a stiff frame, separate from the sealing frame. In the case of large panes spacers might be necessary between the panes.

The sealing metal strip can be manufactured by deformation of for instance a flat copper strip which can also be electrolytically treated to change the surface or to make the edges thinner. As an alternative the whole sealing strip could be manufactured by electrolytical deposition.

The manufacture of a multiple pane window unit according to the invention will be described hereinafter as an example:

A copper strip which is about 0.1 millimeter thick and 20 millimeters wide is rolled to the desired corrugation, cut, formed and welded together to rectangular "rings" somewhat smaller than the desired size of the panes. Said rings are each provided with a small vent hole and are dipped in a solution of borax. The rings then are each placed between two glass panes and by means of a conveyor moved into a funnel oven with dry atmosphere where the temperature of the panes and the copper ring is raised to 500° C. The conveyor, which in this case must be insulated agains eddy currents, then passes an alternating magnetic field, where the induced current in the copper ring raises the temperature of the latter further for a short time sufficient to fuse the edges of the metal strip to the panes. Alternatively the current can be conducted to the ring through leads welded to opposite corners, said leads being removed after the fusion. In the remaining part of the funnel oven the temperature of the unit is slowly lowered; when it has reached room temperature the vent hole is closed by soft soldering and a protective lacquer is sprayed on the outside of the copper ring and the bonds.

It is to be understood that the embodiments of the invention herein shown and described are to be taken as illustrative examples and that the same spirit of the invention is useful not only in manufacturing windows but also can be used for other objects, for instance vacuum apparatus which is built up of separate glass parts.

What I claim is:

1. A multiple pane window unit, comprising, in combination, at least two sheet glass elements having parallel surfaces, a metallic spacer strip having laterally spaced-apart edges, the longitudinal edges of said spacer strip being corrugated to form wave shaped lines, said metallic spacer strip being disposed intermediate said glass elements and directly fused along said corrugated edges only to the adjacent surfaces of said glass elements by a glass-to-metal seal.

2. A multiple pane window unit as set forth in claim 1, wherein said metallic spacer strip has a thickness within the range 0.005 to 0.1 times the thickness of said sheet glass elements.

3. A multiple pane window unit as set forth in claim 2, wherein the corrugations of said edge parts of said spacer strip follow a wave curve having a wave length within the range 0.1 to 10 times the thickness of each said sheet glass element.

4. A multiple pane window unit as set forth in claim 3, wherein at least the central portions of said metallic spacer strip are corrugated to form ridges parallel to said surfaces of said sheet glass elements.

5. A multiple pane window unit, comprising, in combination, at least three sheet glass elements having parallel surfaces, an endless metallic spacer strip having at least one longitudinal corrugation intermediate the lateral edges thereof parallel to said surfaces of said sheet glass elements, said spacer strip being supported edgewise intermediate a pair of said glass elements and having the opposite lateral edges thereof in sealed engagement with the adjacent surfaces of said pair of elements, and a third glass element disposed within the space intermediate said pair of glass elements and having peripheral edges in contact with said longitudinal corrugations of said endless metallic spacer strip.

6. A multiple pane window unit as set forth in claim 5, wherein said spacer strip includes laterally spaced apart edges having corrugations defining a line of contact with said adjacent surfaces of said pair of glass elements, said line of contact being a substantially sine shaped line and having a wave length within the range 0.1 to 10 times the thickness of each said glass element.

7. A composite article comprising, in combination, at least two spaced apart elements made of vitreous material, a metallic spacer sheet in the form of a strip having laterally spaced apart edges and disposed intermediate said elements, said edges being corrugated to form sine waves and said strip being lengthwise corrugated intermediate said elements, said spacer strip being fused along said edges only to surface portions of said elements by a metal-to-glass seal, the thickness of said metal strip being within the range of 0.005 to 0.1 times the thickness of said elements, and the wave length of said corrugated edges being within the range of 0.1 to 10 times the thickness of said elements at the fused edges.

References Cited in the file of this patent

UNITED STATES PATENTS

| | | |
|---|---|---|
| 2,062,836 | Scott | Dec. 1, 1936 |
| 2,077,305 | Batchell | Apr. 13, 1937 |
| 2,122,453 | Clause | July 5, 1938 |
| 2,125,316 | Ronci | Aug. 2, 1938 |
| 2,235,681 | Haven et al. | Mar. 18, 1941 |
| 2,277,871 | Mitchell et al. | Mar. 31, 1942 |
| 2,283,090 | Power | May 12, 1942 |
| 2,386,820 | Spencer | Oct. 16, 1945 |
| 2,457,144 | Goodale | Dec. 28, 1948 |
| 2,508,233 | Dorgelo et al. | May 16, 1950 |
| 2,525,717 | Ottenheimer | Oct. 10, 1950 |
| 2,568,460 | Nolte | Sept. 18, 1951 |
| 2,629,093 | Pask et al. | Feb. 17, 1953 |
| 2,708,774 | Seelen | May 24, 1955 |

FOREIGN PATENTS

| | | |
|---|---|---|
| 569,524 | Canada | Jan. 27, 1959 |